United States Patent [19]
Needham et al.

[11] 3,827,138
[45] Aug. 6, 1974

[54] FRICTION WELDING METHOD

[75] Inventors: James Christopher Needham, Saffron Walden; Colin Ronald George Ellis, Newton; Rodger Hedley Lilly, Comberton, all of England

[73] Assignee: The Welding Institute, Abington, Cambridge, England

[22] Filed: July 8, 1971

[21] Appl. No.: 160,713

[30] Foreign Application Priority Data
July 9, 1970 Great Britain.................. 33447/70

[52] U.S. Cl.......................... 29/470.3, 228/2, 228/8
[51] Int. Cl............................................. B23k 27/00
[58] Field of Search .................. 29/470.3; 228/2, 8; 156/73

[56] References Cited
UNITED STATES PATENTS

| | | | |
|---|---|---|---|
| 3,549,076 | 12/1970 | Mills | 29/470.3 X |
| 3,563,444 | 2/1971 | Loyd | 29/470.3 X |
| 3,595,462 | 7/1971 | Hirayama | 228/2 |
| 3,635,388 | 1/1972 | Jenkinson et al. | 228/2 |

Primary Examiner—J. Spencer Overholser
Assistant Examiner—Robert J. Craig
Attorney, Agent, or Firm—Kemon, Palmer and Estabrook

[57] ABSTRACT

To join two workpieces by friction welding, in the period of axial shortening (due to burn-off) during relative rotation of the workpieces, the workpieces are compelled to approach one another at a rate dictated by an axial driving means, the rate of generation of frictional heat being automatically adjusted to give the required burnoff rate. The rate of axial approaching movement may be imposed by a screw feed or a cam or by a hydraulic cylinder supplied by a high delivery source through a controlling orifice.

3 Claims, 4 Drawing Figures

FRICTION WELDING METHOD

In commercial friction welding, quality control is based on monitoring the friction welding machine parameters during the welding cycle and/or routine batch destructive testing. The monitoring method assumes that the values of the machine parameters which are obtained correspond to the values at the weld interface. A better method which has been proposed is to measure the magnitude of the burn-off or upset, that is to say the axial shortening of the workpieces during the welding cycle. The measurement of the axial shortening of the workpiece is a direct measurement of the effect of the machine parameters on the region in which the weld is being produced. It also indicates the extent of radial extrusion of the interface material and therefore the removal of the contamination present on the original butting surfaces. The burn-off distance is therefore a useful criterion in that it must be sufficient to ensure that impurities at the centre of the section have been displaced into the upset collar.

However, we have discovered that the weld strength is closely related to the burn-off rate, which is thus a more useful criterion than the burn-off distance. For any given material, there is a preferred burn-off rate which is substantially independent of the specimen area and rotational speed over a range which is usually at least ±20 percent for each of these parameters and may be much higher and therefore minor variations in specimen area or in the relative rotational speed of the workpieces are of little consequence provided that the burn-off rate is held within an acceptable range. Mild steel is an example of a material which is not very sensitive to changes of area and rotational speed. The preferred burn-off rate for mild steel would provide tensile strength equivalent to the unwelded parent material for a change of ±50 percent of workpiece area and of speed of rotation.

According to the present invention, two aligned workpieces to be joined by friction welding are driven in relative rotation under axial pressure to cause frictional heat at the contacting workpiece faces and axial shortening of the workpieces, the relative rotation being thereafter stopped; for at least the major part of the axial shortening during relative rotation, the workpieces are substantially locked, for axial approaching movement, to an axial driving means, whereby the rate of generation of frictional heat and consequently of axial shortening of the workpieces is dictated by the rate of axial movement of the said driving means. The rate may not be the same throughout the axial shortening during relative rotation. For example, it may be a continuing acceleration, provided that the axial rate of shortening falls within the optimum range for a substantial part (for example 30 percent) of the duration of the main friction stage of the welding operation, that is to say, the stage following the torque peak in the initial stage of the operation. In some cases, particularly when dissimilar metals are being joined, it may be desirable to employ two approach rates in sequence, the lesser velocity generally proceedig the greater velocity. The two sequential rates may also be employed, without dissimilar metals, when the capacity of the driving equipment is limited, the higher rate being employed for a substantial part of the main friction stage and controlling the joint quality.

Thus, the rate of approach of the components being welded (the burn-off or displacement rate) is determined primarily by the machine and is not merely the result of applying a load to the material. In the latter case, the rate of burn-off varies with changes in the characteristics of the material, with changes in dimensions and changes in rotational speed, as well as with errors in the system applying the force due to stiction, for example. Moreover the control of the axial shortening rate is achieved without a closed loop, that is to say without measuring the rate and comparing it with a predetermined rate and then using the difference to control axial pressure or relative rotational speed to reduce the error.

As an example, the axial movement of a movable workpiece may be controlled through the engagement of a rotating screw and an internally threaded member mounted on the screw. If the heat generated is such that the rate of burn-off tends to become too high, the axial approaching movement permitted by the screw is less than would otherwise take place and consequently the friction at the weld faces is reduced, thereby reducing the heat input to the weld area and providing a compensating adjustment of the rate of burn-off. If the rate of burn-off is too low an opposite effect is obtained, the friction being increased to give a greater heat input at the weld area and thereby to increase the burn-off rate to the required value.

In order that the invention may be better understood, one example of the apparatus embodying the invention will now be described with reference to the accompanying drawings, in which.

Figure 1:
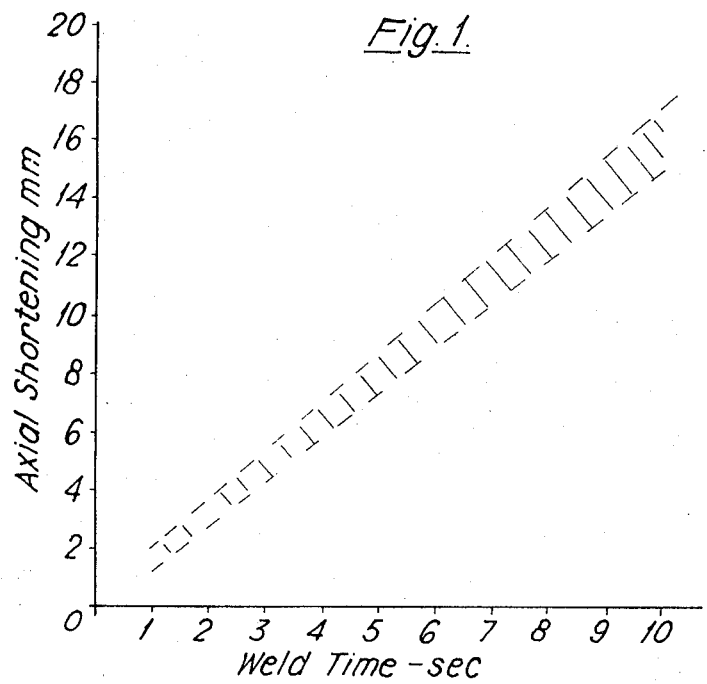
FIG. 1 is a graph showing the importance of the rate of axial shortening.

FIG. 1 is a graph showing axial shortening of the workpieces against weld time so that the slope of any line plotted on this graph represents the rate of axial shortening. The area between the dotted lines indicates the zone within which acceptable welds are produced. For the purposes of this specification the selection of acceptable joints is based on the bend test which enables both mechanical strength and ductility to be determined. The graph given is for a cold-drawn mild-steel bar having a diameter of 18 mm. welded under constant pressure conditions. No final forging force was used. In the region above the zone of acceptable welds the joints suffered from over-consolidation, which decreases ductility. Below the zone of acceptability the joints showed undesirable metallurgical characteristics. For other metals there would be a generally similar zone of acceptability but both the slope and the range might be different. For a method in which the rate of burn-off increases throughout the main friction stage or has two or more values during the main friction stage, the characteristic plotted on FIG. 1 should fall within the zone of acceptability for at least 30 percent of the duration of the main friction stage.

Figure 3:
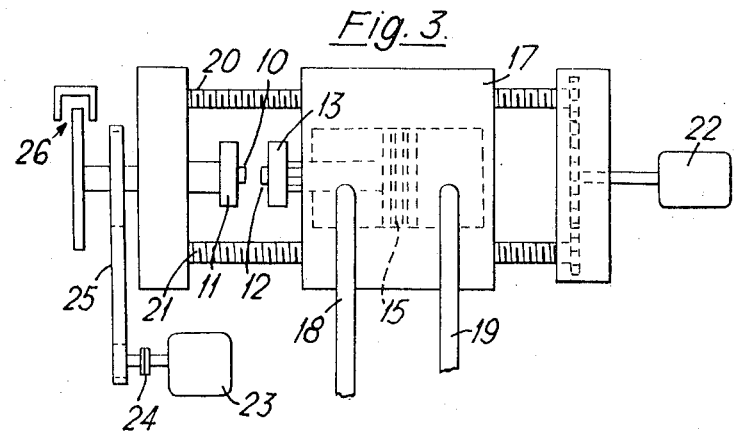
FIG. 3 shows diagrammatically the driving arrangements for the friction welding apparatus.
Figure 2:
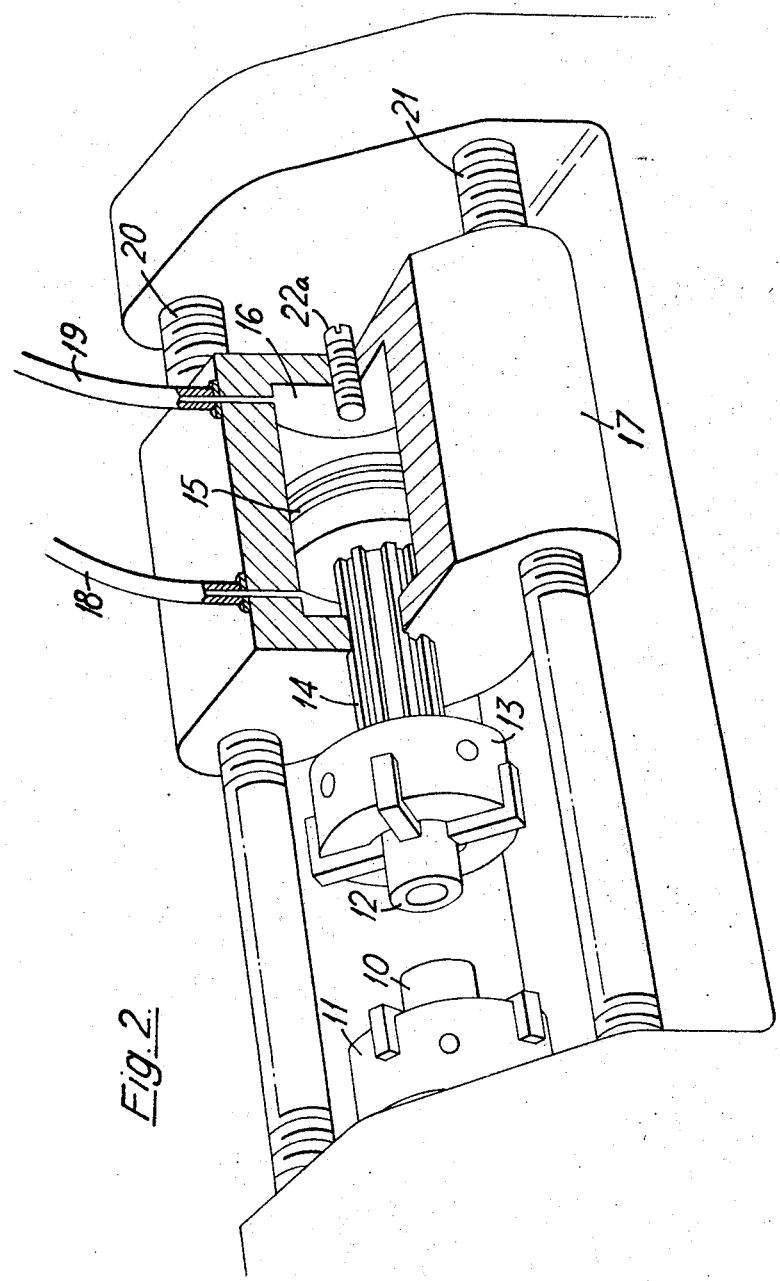
FIG. 2 is a front perspective view, partly broken away, of the friction welding apparatus.

In the apparatus shown in FIGS. 2 and 3, the axial shortening or burn-off rate during the main friction stage is imposed on the system mechanically by feeding the axially movable workpiece forward at the required rate during burn-off. A workpiece 10 is placed in a rotatable chuck 11 which does not move axially and a workpiece 12 is placed in a chuck 13 which does not rotate but can be moved axially. The chuck 13 is mounted on a splined shaft 14 connected to a piston 15 in a cylinder 16 formed within a carriage 17. The position of the piston within the cylinder is controlled by a hydraulic system connected to the lines 18 and 19. The carriage 17 is formed with two internally threaded bores through which pass the threaded rods 20 and 21, the threads of these rods engaging the internal threads of the bores so that when the rods are rotated in appropriate directions the carriage 17 is advanced or withdrawn at a speed dependent on the speed of rotation of the rods.

As shown in FIG. 2, the rods 20 and 21 are driven, through a gear train, from a motor 22. The chuck 11 is rotated by a motor 23 through a clutch 24 and belt 25. A brake 26 is provided for arresting rotation of the chuck 11. The speed of rotation of rods 20 and 21 is such that the carriage moves forward at the required rate of axial shortening of the workpieces.

The screw feed continues after contact. Since no shortening of the parts occur during early stages of friction welding, high pressures and torques are developed but these can be reduced by controlling the rate of pressure build-up (and hence the torque) by means of a diaphragm, which controls the rate of compression of the hydraulic fluid.

Figure 4:
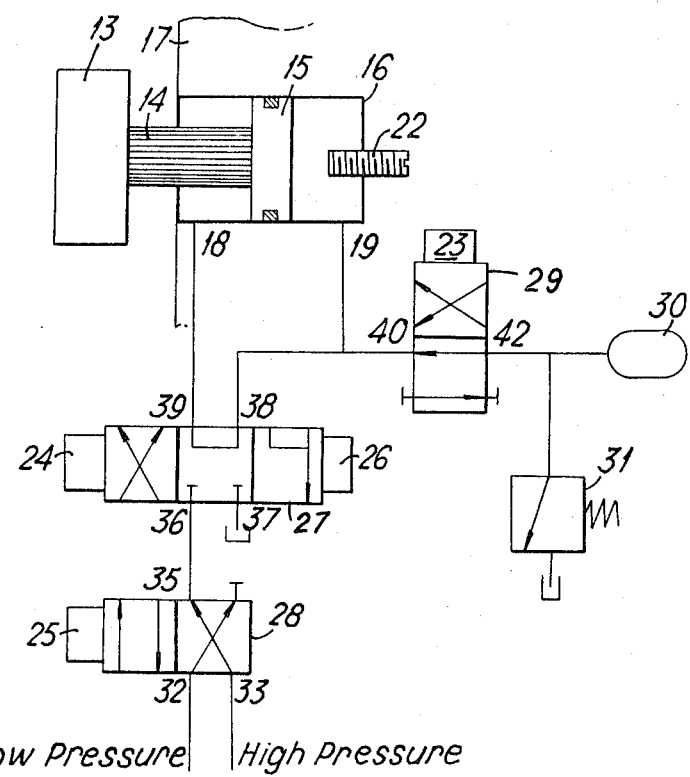
FIG. 4 is a diagram of a hydraulic circuit for use with the apparatus shown in FIGS. 2 and 3.

FIG. 4 shows the hydraulic control apparatus for the cylinder 16. Initially the cylinder is filled with low-pressure oil from a source (not shown) through valve 28, in which solenoid 25 is energised and ports 32 and 35 are inter-connected, and valve 27 in which ports 36 and 38 are connected. At this time solenoid 23 is energised and ports 40 and 42 of valve 29 are disconnected so that valve 29 is closed. When the screw rods are rotated to advance the carriage the conditions of the solenoids 24 and 26 of valve 27 are such that ports 38 and 39 are interconnected (as shown in the drawing) and the low-pressure and high-pressure hydraulic supplies are disconnected. Thus, the two sides of the cylinder are coupled through valve 27. Valve 29 is now de-energised to connect port 19 through valve 29 to the accumulator 30 and a relief valve 31. On engagement of the workpieces, oil in the rear part of the cylinder is compressed and this continues until the piston strikes the end of an adjustable screw stop 22. Thereafter the piston and the carriage move together. At the end of the frictional heating stage the conditions of valves 27 and 28 are made such that the high pressure hydraulic supply is applied through ports 33 and 35 of valve 28 to port 36 of valve 27 and thence to port 38 of the valve and port 19 of the cylinder. The solenoid 23 of valve 29 is energised to place it in a shut-off condition.

At the end of the forging operation solenoid 26 of valve 27 is energised so that high pressure oil in the cylinder is released, removing the forge force.

At the end of the operation, the joint workpieces are released from the chunks so that the screw feed can be reversed to return the carriage back to its original position in readiness for the next operation.

When the burn-off rate is to be switched from one value to another value in the course of the main friction stage, this can be done by detecting the achievement of a predetermined burn-off distance or after a predetermined period following contact between the workpieces, or by a change of power or torque, by vibration, sound or radiation.

It will be appreciated that the above example is susceptible to many variations, particularly in the initial and final stages of the friction welding operation. For example, the initial stage, after the workpieces have made contact, instead of taking place under conditions of controlled pressure, may take place at a pre-set axial approach speed less than that of the speed required during the main frictional portion of the welding cycle. The transition to the main frictional heating stage may occur when the torque has been reduced from its initial peaks to a lower value, or when burn-off has already commenced and a predetermined rate of burn-off has been achieved.

Instead of using lead screws to control the axial approach speed, a cam can be used. Alternatively, a hydraulic ram may be used with a pre-set rate of oil feed; thus the output of a high-delivery source may be applied through a controlling orifice to the cylinder.

This main frictional heating stage can be maintained for a predetermined time, instead of for a predetermined burn-off distance.

In the above example, reference was made to applying a forging pressure at the end of the firctional heating stage. This is not essential, though generally desirable.

Although a mechanical stop has been shown in the drawings for locking the piston in the cylinder, it is also possible to use a hydraulic lock.

The relative rotation may be stopped when a predetermined burn-off distance has been achieved. This may be detected by a limit switch.

If desired the relative rotation of the workpieces and the power for the welding operation may be provided by a driving system including an energy storage member, for example a flywheel. Welding by means of such arrangements is sometimed referred to as inertia welding.

We claim:

1. A method of joining two workpieces by friction welding, in which the workpieces are gripped in workpiece holders and are aligned and driven in relative rotation under axial pressure to cause frictional heat at the contacting workpiece faces and to cause relative axial approaching movement of the workpieces with axial shortening of the workpieces, the relative rotation being thereafter stopped, the improvement comprising imposing on the workpiece holders, for at least the major part of the axial shortening during relative rotation, a predetermined rate of relative axial approaching movement at any instant in accordance with a predetermined cycle, whereby the imposed rate of axial approaching movement of the workpiece holders dictates the rate of generation of frictional heat and consequently of axial shortening of the workpieces.

2. A method in accordance with claim 1 wherein said cycle is one in which said workpieces in the said major part of the axial shortening during relative rotation are driven toward one another by the axial driving means initially at a first predetermined rate and thereafter at a second and higher predetermined rate.

3. A method in accordance with claim 1 wherein said cycle is one in which said workpieces in the said major part of the axial shortening during relative rotation are driven towards one another at a rate which progressively increases.

* * * * *